United States Patent [19]

Gallagher

[11] Patent Number: 5,311,461

[45] Date of Patent: May 10, 1994

[54] PROGRAMMABLE PRIORITY AND SELECTIVE BLOCKING IN A COMPUTE SYSTEM

[75] Inventor: Patrick W. Gallagher, Vestal, N.Y.

[73] Assignee: International Business Machines Corp., Armonk, N.Y.

[21] Appl. No.: 292,297

[22] Filed: Dec. 30, 1988

[51] Int. Cl.$^5$ .............................................. G06F 9/46
[52] U.S. Cl. .................................................. 395/650
[58] Field of Search ... 364/200 MS File, 900 MS File

[56] References Cited

U.S. PATENT DOCUMENTS

| | | | |
|---|---|---|---|
| 3,711,835 | 1/1973 | Saeger et al. | 364/200 |
| 3,836,889 | 9/1974 | Kotok et al. | 364/200 |
| 4,028,664 | 6/1977 | Monahan et al. | 364/200 |
| 4,237,534 | 12/1980 | Felix | 364/200 |
| 4,314,335 | 2/1982 | Pezzi et al. | 364/200 |
| 4,334,288 | 6/1982 | Booher | 364/900 |
| 4,473,880 | 9/1984 | Budde et al. | 364/200 |
| 4,533,994 | 8/1985 | Harrill et al. | 364/200 |
| 4,609,995 | 9/1986 | Hasebe | 364/200 |
| 4,621,342 | 11/1986 | Capizzi et al. | 364/900 |
| 4,755,938 | 7/1988 | Takahashi et al. | 364/200 |
| 4,760,515 | 7/1988 | Malmquist et al. | 364/200 |
| 4,809,164 | 2/1989 | Fuller | 364/200 |
| 4,814,974 | 3/1989 | Narayanan et al. | 364/200 |

FOREIGN PATENT DOCUMENTS 0239979  10/1987  European Pat. Off.

OTHER PUBLICATIONS

IBM TDB vol. 22, No. 10, p. 4697 (Mar. 1980), G. G. Langdon, Jr., "Round-Robin Priority With Decentralized Bus Control".

IBM TDB vol. 27, No. 7B, p. 4470 (Dec. 1984), C. A. Malmquist et al., "Bus Arbiter With Selectable Rotating Highest Priority".

IBM TDB vol. 28, No. 2, p. 567 (Jul. 1985), T. J. alpers, "High Speed Bus Arbiter for Bus-Oriented Multiprocessor Systems".

IBM TDB vol. 29, No. 8, p. 3272 (Jan. 1987), C. A. Malmquist et al. "Bus Arbiter With Dynamic Priority Adjustment".

Primary Examiner—Douglas W. Olms
Assistant Examiner—T. Samuel
Attorney, Agent, or Firm—Pryor A. Garnett; David S. Romney

[57] ABSTRACT

In a computer system in which conflicting requests for resources are prioritized, a programmable priority determination method and system. Relative priority between competing sources or requests is represented by a control word (priority code). The control word includes bits identifying the highest priority source, and rotation and skip bits determining the order or priority among the other sources. The control word is used to pre-set a priority circuit which then selects from among competing resource requests based on the priority represented by the control word. Relative priority between the sources can be changed during operation of the computer system by creating a new control word and applying it to the priority circuit.

2 Claims, 6 Drawing Sheets

TWO SOURCE   THREE SOURCE   FOUR SOURCE

| PRIORITY CONTROL BITS | | PRIORITY SOURCE ORDER |
|---|---|---|
| HP | R | |
| 0 0 | 0 | 00, 01, 10 |
| 0 0 | 1 | 00, 10, 01 |
| 0 1 | 0 | 01, 10, 00 |
| 0 1 | 1 | 01, 00, 10 |
| 1 0 | 0 | 10, 00, 01 |
| 1 0 | 1 | 10, 01, 00 |

| BIT DEFINITIONS | |
|---|---|
| HIGHEST PRIORITY SOURCE CODE | PRIORITY PROCESSES REQUEST FROM HERE IF PRESENT. IF NOT, IT WILL PROCESS THE NEXT HIGHEST PRIORITY LEVEL WITH A REQUEST. |
| ROTATION BIT | CHANGES DIRECTION AROUND POD'S VISUALIZED CIRCLE OF SOURCES. |
| SKIP BIT | SKIPS ONE OR TWO SOURCES FOLLOWING THE SOURCE OF HIGHEST PRIORITY IN THE DIRECTION THAT THE ROTATIONAL BIT INDICATES. |

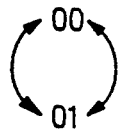
TWO SOURCE

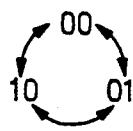
THREE SOURCE

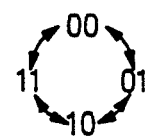
FOUR SOURCE

PRIORITY CONTROL BITS

| HP | R |
|----|---|
| 0 0 | 0 |
| 0 0 | 1 |
| 0 1 | 0 |
| 0 1 | 1 |
| 1 0 | 0 |
| 1 0 | 1 |

PRIORITY SOURCE ORDER 00, 01, 10
00, 10, 01
01, 10, 00
01, 00, 10
10, 00, 01
10, 01, 00

BIT DEFINITIONS

| HIGHEST PRIORITY SOURCE CODE | PRIORITY PROCESSES REQUEST FROM HERE IF PRESENT. IF NOT, IT WILL PROCESS THE NEXT HIGHEST PRIORITY LEVEL WITH A REQUEST. |
|---|---|
| ROTATION BIT | CHANGES DIRECTION AROUND POD'S VISUALIZED CIRCLE OF SOURCES. |
| SKIP BIT | SKIPS ONE OR TWO SOURCES FOLLOWING THE SOURCE OF HIGHEST PRIORITY IN THE DIRECTION THAT THE ROTATIONAL BIT INDICATES. |

FIG.1

PROGRAMMABLE PRIORITY AND SELECTIVE BLOCKING IN A COMPUTE SYSTEM

This invention relates generally to priority determination in a computer system, and more particularly to providing programmable priority as well as selective blocking in order to make selections between instructions and commands which require the use of common resources.

BACKGROUND OF THE INVENTION

In computer systems, and particularly those which incorporate multiple processors, it is neccesary to have a system for determining priority between commands or instructions which cannot be executed at the same time. Most prior art priority systems are fixed in whole or in part and do not allow the flexibility that is desirable.

What is needed is some type of priority system for use when one or more requests is submitted to a serial path within a processing structure. The priority system should, for all practical purposes, select the request in a known order that will be desired for the system. If the best priority order is unknown at the time the machine is built or if the best priority order changes from operation to operation, some programmability will be needed.

OBJECTS AND BRIEF SUMMARY OF THE INVENTION

It is therefore an object of the present invention to provide a programmable priority scheme which can be implemented with little cost in circuitry.

Another object is to avoid the typical round-robin type of priority which does not take into account the custom needs for expeditious processing of certain types of commands and instructions.

A further object is to assign source IDs and then provide a programmability priority code which selects the order that the IDs will be selected.

Another important object is to provide the capability of a complete reordering of all sources for each different programmable priority code, while at the same time giving the appearance of being fixed during actual operation.

Yet another object is to provide selective blocking of sources so that any source can come down with a command and block out any of the other sources from entering the priority until that particular source (e.g., a processor) resets it.

An additional object is to provide monitor registers to watch a command after it was selected by priority, and if a contention arises forcing the command to start over, the monitor registers make note of it and prevent the command from stealing priority cycles until the contention is resolved. Once it is resolved, the monitor register is reset and the command is allowed to re-enter priority.

Accordingly, the invention provides a programmable priority code which can completely change the order of priority, and also provides a method for selectively blocking out requests which have already been cleared where contention, error, or other events create a need to override the priority.

BRIEF DESCRIPTION OF THE DRAWINGS

FIG. 1 is a schematic showing the tree structure priority and control bit format for a presently preferred embodiment of the invention;

DETAILED DESCRIPTION OF PREFERRED EMBODIMENTS

Figures 2, 2A:
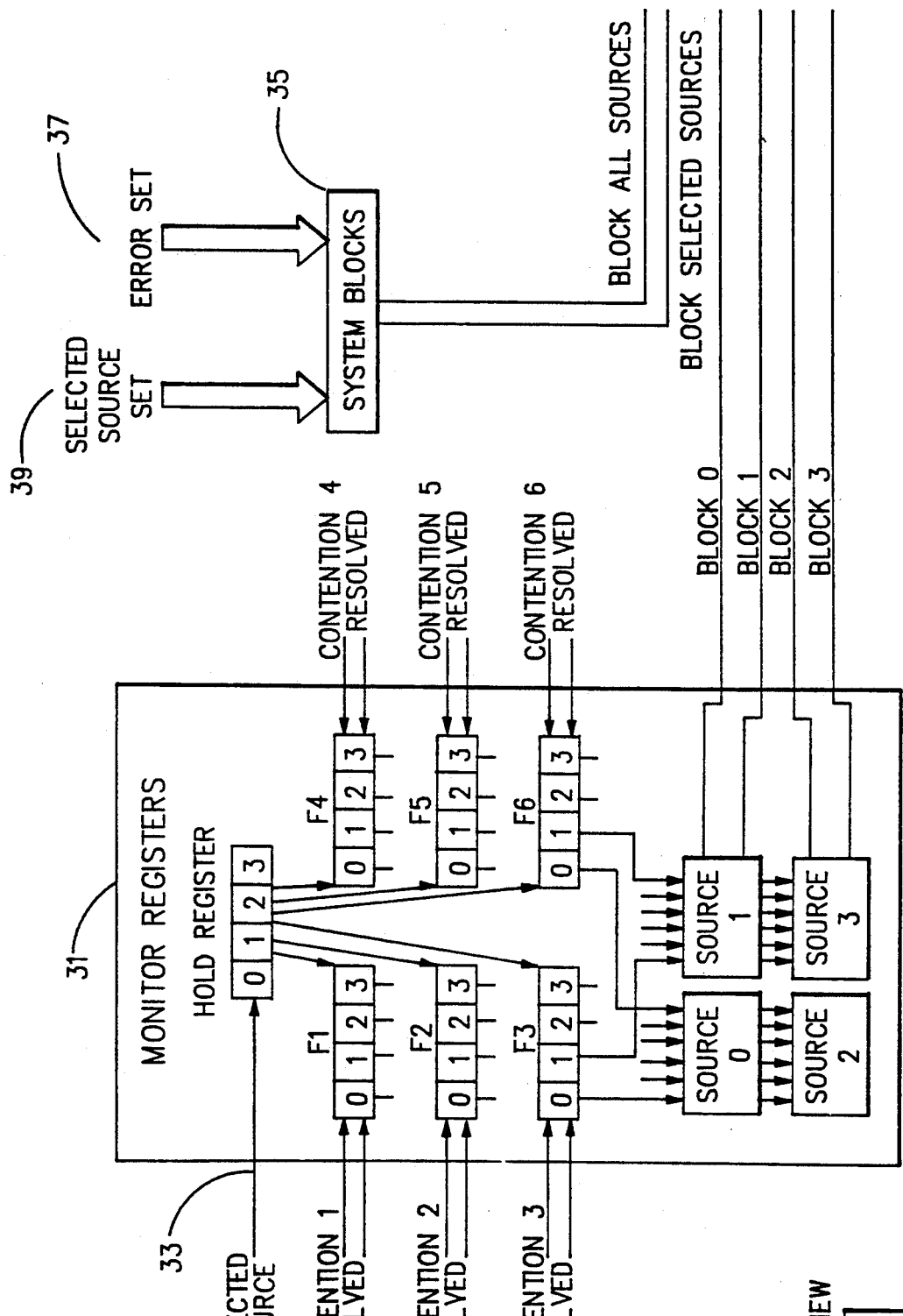
FIGS. 2, 2A and 2B are a high level block diagram showing the coordination and interaction between the various blocking signals and the priority circuitry.
Figure 2B:
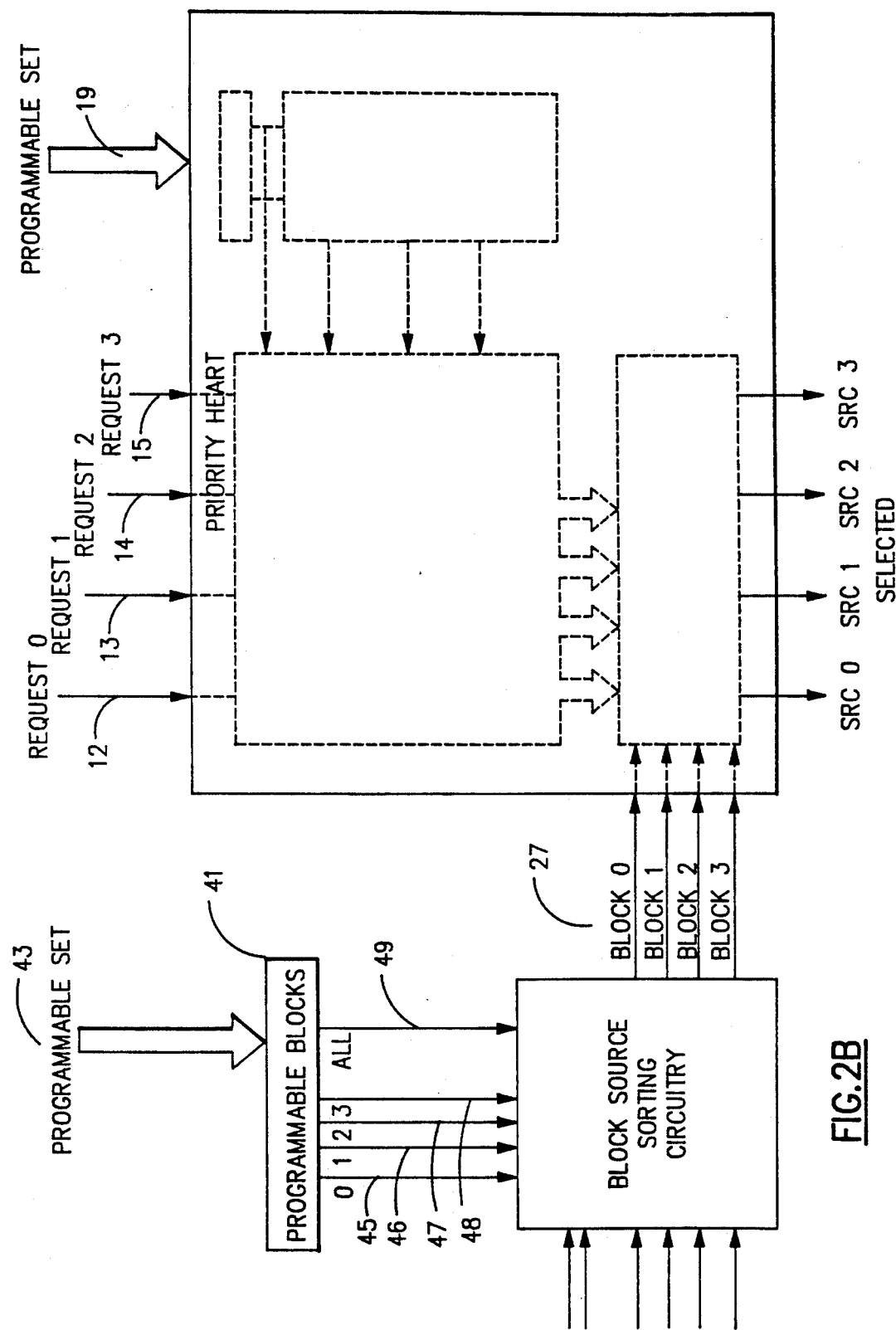

The illustrated embodiments of the invention provide a unique technique for dealing with a complicated problem by using a tree structure priority which consists of pods that can select between two to four sources. Each pod is controlled with an increasing number of bits of data, from two up to five. Two bits for a two-source pod, three for a three-source pod and five for a four-source pod. Each source is given a code, i.e. source one—00. The sources in the pod for best understanding, should be visualized as a circle (see FIG. 1). It can be seen how the assigned source codes are given in the diagram. One of these codes will be placed as the first two bits of data controlling the pod's priority. The source whose code is placed there will have the highest priority. If this source has a request, it will be processed independent of what the other sources have as a request. Thus, referring to FIG. 1, HP identifies the highest priority source code. Any request present from this source is processed first. If not, any request from the next highest priority level will be processed.

In a two-soure pod, these two bits are all that is needed; even one bit can be used if it does not break consistency with the rest of the tree structure. Because if the code of the source in the bits used specifies the source of highest priority, then the source not specified is second in line for priority.

The third bit that controls the priority of the pod is used as an indicator of rotation around the visualized circle in FIG. 1. This rotation bit identified by R provides for changes of direction around the pod's visualized circle of sources. The rotational bit will distinguish which source follows the source with the highest priority. If the rotational bit is zero, then the path will be clockwise around the circle. If the bit is one, the path will be counter-clockwise around the circle. This bit is needed only for a three or four-source pod. In a three-source pod, if the highest priority code is 00 with the rotational bit set to 0, then the order of priority will be 00, 01, 10. If the rotational bit was a (1), the order of priority would be 00, 10, 01. It can be seen in the previous example that if the source having the highest priority changes from 00 to either 10 or 01, the rotational bit will alter the priority source order in a way to achieve all six combinations of the sources (see FIG. 1).

The fourth and fifth bits are for a four-source pod only. The fourth bit states that the source that would normally be second, as indicated by the highest priority code and the rotational bit, is now last. For example, in the four-source pod, the first three control bits set up a priority source order of 00, 01, 10, 11. The fourth bit, if set to one, would change the order to 00,10,11,01, rotating the last three sources one position.

The fifth bit, if set to a one, will behave much like the previous one, but the last three sources rotate two positions. So, in the example above, the priority source order 00,01,10,11 will change to 00,11,01,10. This fifth bit will rotate the order of the last three sources by two positions independent of the fourth bit. The fifth will override the fourth if the fifth is set to a 1.

These last two bits are called skip bits because they provide for skipping one or two sources following the source of highest priority in the direction that the rotational bit indicates.

We will next consider the circle for a four-source pod. Starting at the source of highest priority, moving in the direction that the rotational bit indicates, we will assume the highest priority is 00 with rotational bit of 0. Now, if the first skip bit is high and the second low, it states that the priority source order should be 00, 10, 11, 01 as shown in the previous example. This source order can be achieved by starting at 00, skipping the next source 01 to 10, then continuing around the circle until all sources are selected. It can be seen that 00 was not selected the second time around since it was previously selected. The second skip bit will do the same except the next two sources would be skipped after 00. Selection of source would then continue until all sources are selected. Thus, the skip bits are two bits which indicate if the next source or the next two sources are to be bypassed the first time around the priority circle.

It is to be emphasized that the programmable priority of this invention can be used to set priorities at the time of installation of a computer system, and/or alternatively can be changed dynamically at any time during the operation of the computer system.

Figure 3:
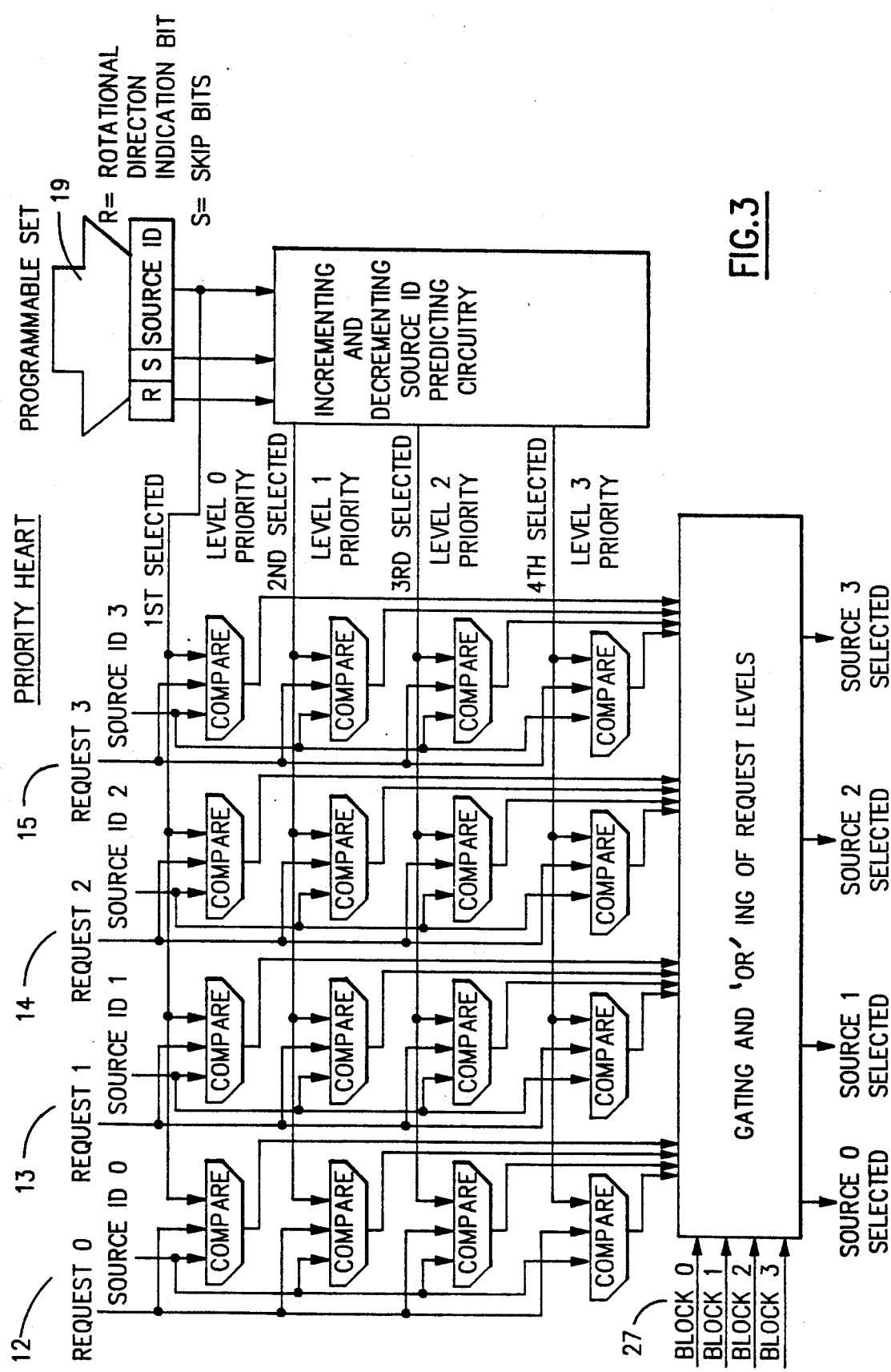
FIG. 3 is a flow diagram showing the functional flow in the priority circuitry with four sources.
Figure 4:
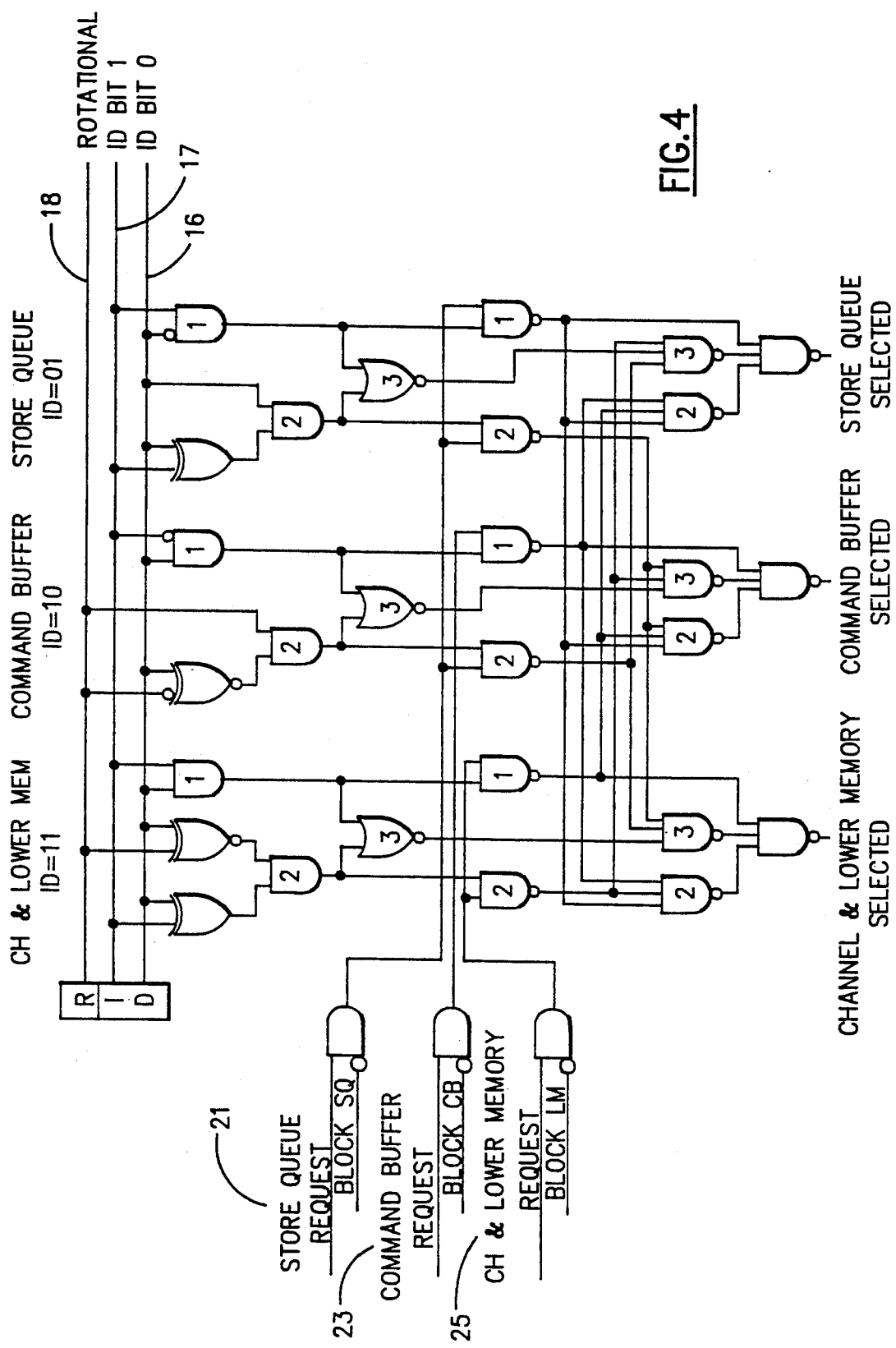
FIG. 4 is an exemplary circuit diagram showing the gating which could be used to implement a priority code for three sources.

The foregoing priority scheme is implemented in the so-called priority heart of FIG. 3 which is controlled by a programmable set 19 having rotational direction, skip and source ID bits, This embodiment of FIG. 3 illustrates the handling of up to four request 12, 13, 14, 15 for a common resource. The embodiment of FIG. 4 shows exemplary circuitry for controlling the priority among three such requests. In that regard, the a numbers 1, 2, and 3 identifying the first three levels of priority in FIG. 3 correspond to the numbered gates on FIG. 4. By changing the two ID bits on circuit lines 16, 17 and the rotational bit on the circuit line 18, the gating will automatically change the priority handling conflicting requests received at the same time, such as the Store Queue request 21 coded 01, the Command Buffer request 23 coded 10 and the Channel & Lower Memory request 25 coded as 11. In this example, the code 00 is an invalid entry. When blocking occurs from any of the blocking circuit 27 of FIG. 2, then that particular source or sources is prevented from being selected until the blocking is terminated.

Figure 5:
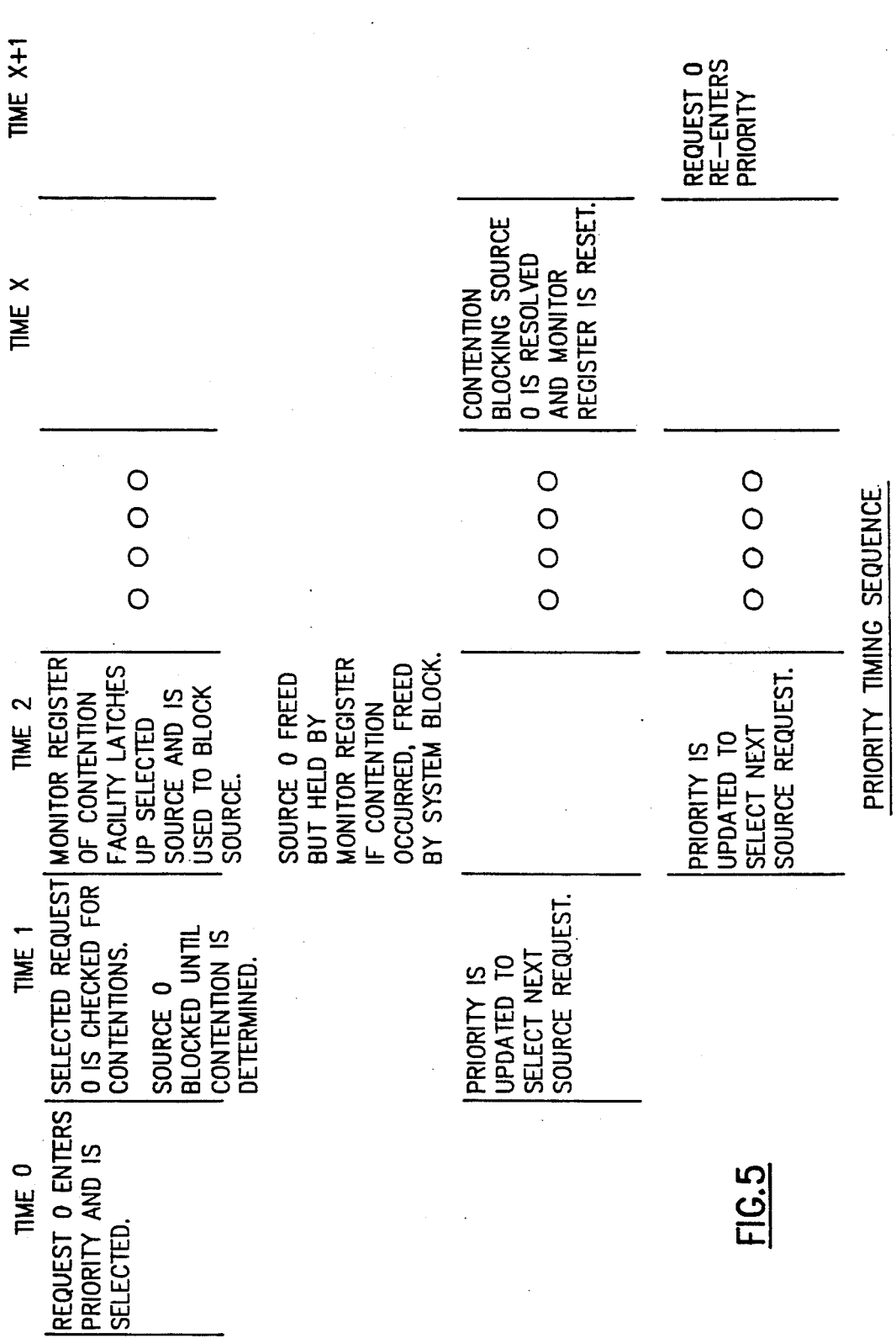
FIG. 5 is a timing diagram.

One source of blocking which constitutes an important feature of this invention is the implementation of various numbers of registers that monitor contentions—they are called Monitor Registors 31 which are specified as F1 through F6 in FIG. 2. Any selected request is input at 33 in order to delay its execution until the existence of any contentions is determined (see FIG. 5). If a contention exists, the request is held in abeyance until the contention is resolved, at which time it reenters the priority circuitry. A preferred implementation of the invention has sources which include multiple processors. The monitored contentions in this implementation are due to Lock, Linehold and Freeze registers (not shown). The Locks are registers that prevent any other processor from altering the status of an eight byte segment of data. The Lineholds are a series of three registers per processor that prevents lines from being invalidated at the cache level. The Freeze registers are used to prevent duplicate inpage requests for the cache level, of the same data.

The monitor registers are a series of registers that are associated with the Lock, Linehold and Freeze registers. Since this design has six processors then there are six freeze registers and thus six monitor registers for these freeze registers. When it comes to the Lineholds and Lock register there is no need to have a separate monitor register for each of the eighteen Lineholds and for the each of the six Lock registers. First, the Lineholds and the Locks are mutuality exclusive and share the same phyical register, so there is no need for separate monitor registers either. Second, the three Lineholds for each processor are reset at the same time, so they can be grouped into one monitor register. This gives twelve monitor registers in all, six to cover contentions on the Freeze registers and six to cover the contentions on the Locks and Lineholds.

Within a monitor register there is a bit corresponding to each of the sources of commands needed to aid the priority at the appropriate level. There are only two sources of commands per processor needed, they are the Command Buffer and the Store Queue. The other source of commands in this implementation is the BSC (Bus Switching Control) interface and it is controlled by the BSC priority, so it is not needed in the monitor registers. Rather than the four bit registers of FIG. 2, these monitor registers will have twelve bits, two for each processor, one for each command buffer (CBx) and one for each store queue (SQx). They will be configured as follows:

Monitor register's Contents

When anything is prevented due to one of the above conditions, a possible contention arises. If a line is prevented from being invalidated by one of the Lineholds and a source tries to invalidate it, a contention occurs. In this case the source trying to do the invalidation is prevented from doing it as a result of an address match on the Linehold and it is held out of priority by blocking until the Linehold is cleared. The Linehold is cleared due to the storing of data in a sequential store buffer to the cache (not shown). At this time all the Lineholds holding the addresses of the data are reset and thus the monitor registers associated withu these Lineholds are also reset, thereby terminating the blocking.

Another example would be a lock on eight bytes of data. The data could be locked by processor 'A' while processor 'B' wants to store to that data. In this case a contention occurs. The monitor register associated with that lock detects an address match and sets high the bit position of the source request-mg to do the store. In this case the store queue bit w be set for processor 'B' in processor A's lock's monitor register. The store queue bit that was set will prevent processor 'B' from trying to restart its store command until the locked data is freed. This will prevent priority cycles from being wasted by this command when they can be used for other sources that can be executed (see FIG. 5). It's not just this bit that can block the priority for processor B's store queue, but each bit that represents processor B's store queue in each of the twelve monitor registers. They all must be zero for a request to be processed by priority or otherwise the request won't be processed until they are zeroed. In this example the lock is the only contention for processor B's store queue and at the time that processor 'A' releases the data from its lock, the monitor is also reset. Since the contention is resolved, all the sources that were held out of priority by that monitor register associated to processor A's lock, like processor 'B', will then be allowed back into the priority circuitry.

The other blocking which can override the normal priority selection is shown in FIG. 2 and includes blocking initiated through the system blocks 35 by Error Set 37 and/or by Selected Source Set 34. It also includes blocking initiated through the programmable blocks 41 by Programmable Set. As shown in the drawing, the blocking can be for application to individual sources or to all the sources, depending on the circumstances. It is important to note that during any blocking, the request being blocked does not continue to enter the priority heart, but awaits resolution of any contention or other event causing the blocking, and then re-enters the priority heart.

While a particular scheme of programmable priority and related override blocking has been shown, it will be appreciated by those skilled in the art that changes and modifications can be made without departing from the spirit of the invention. Accordingly, such variations which would be obvious to those skilled in the art are included within the scope of this invention as set forth in the claims which follow.

I claim as my invention:

1. A computer-implemented method of determining priority between three or more requests which are directed from three or more respective sources thereof for execution by a common resource, including the steps of:

assigning each source an encoded ID;

identifying the source of each request by the ID of said source;

programming a priority code which identifies the relative priority between requests from the sources, said priority code including at least one of said encoded IDs and a rotation bit for determining the rotation between the requests from those sources other than the sources identified by said at least one of said encoded IDs;

sending the programmed priority code through a priority circuit in order to pre-set the circuit in accordance with the relative priority; and directing the requests through the priority circuit in order to select the requests for execution in priority order the respective IDs of the requests in accordance with the relative priority identified by the priority code.

2. The method of claim 1, wherein there are four or more sources, and wherein the priority code further includes a skip bit for determining a starting point of the rotation between requests from the other sources.

* * * * *